No. 865,361. PATENTED SEPT. 10, 1907.
W. K. COOPER.
VINE CUTTER.
APPLICATION FILED DEC. 31, 1906.
2 SHEETS—SHEET 1.
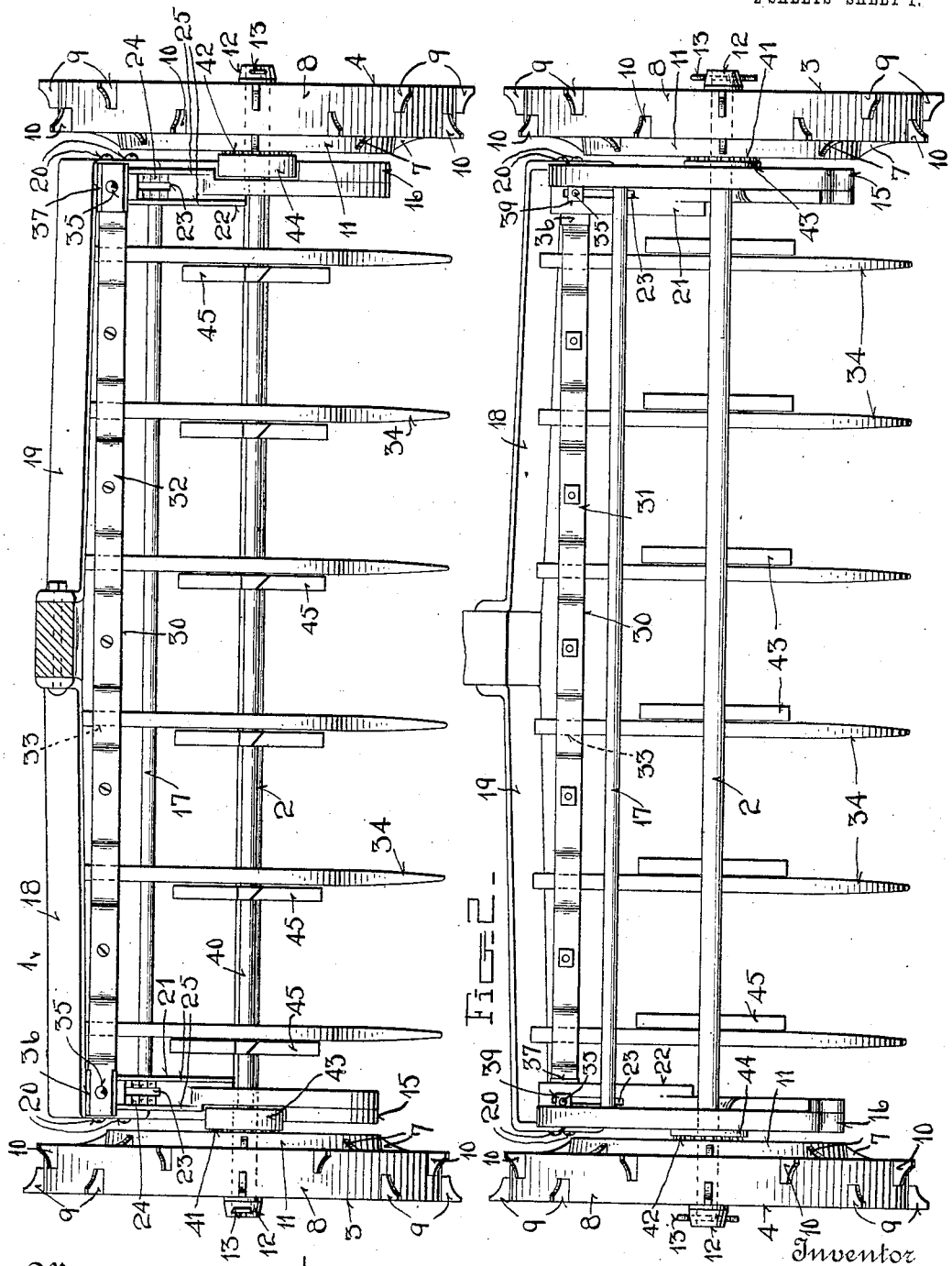
Witnesses
L. B. James
C. H. Griesbauer.
Inventor
William Kimonth Cooper
by A. B. Wilson & Co.
Attorneys

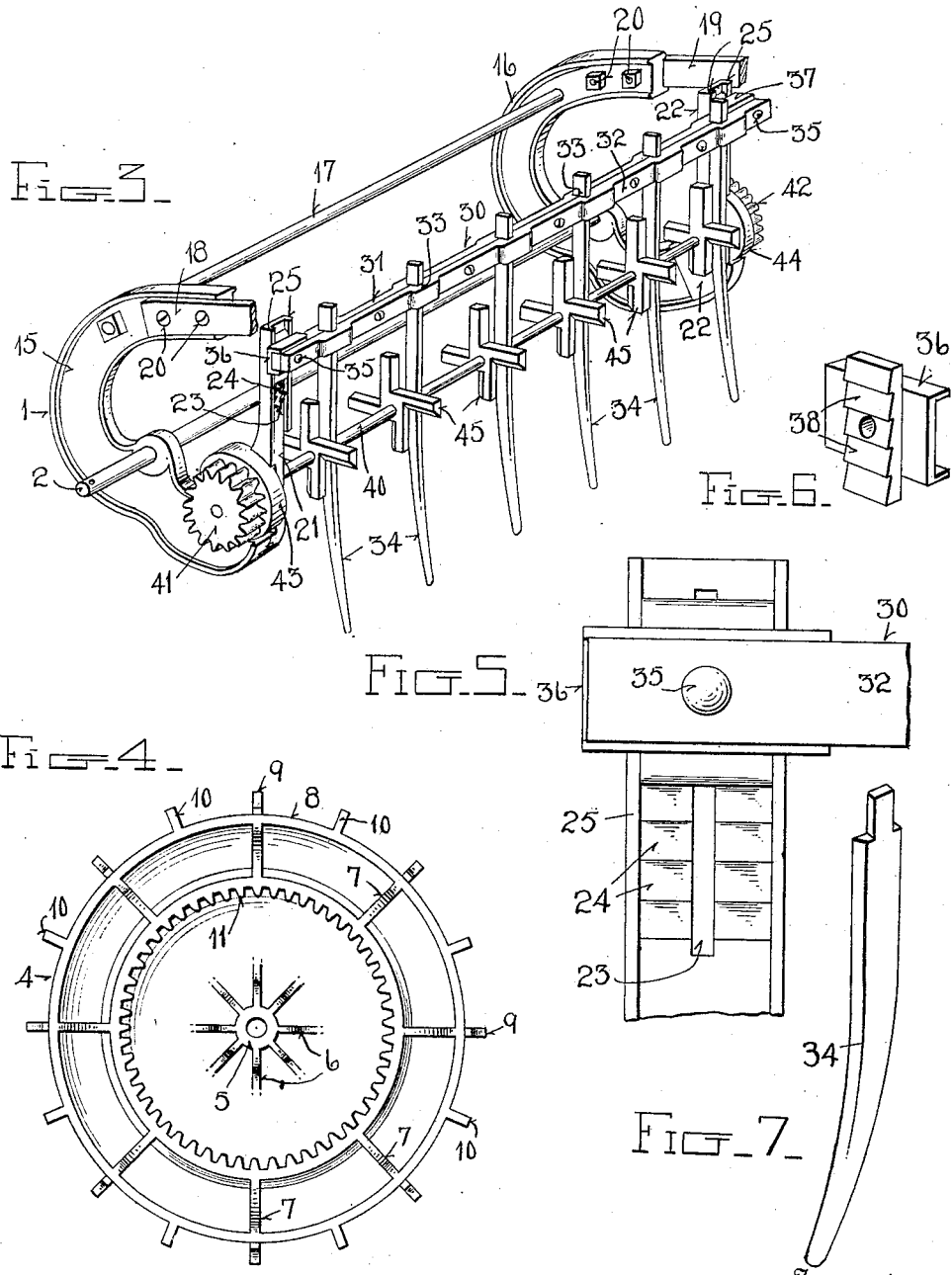

UNITED STATES PATENT OFFICE.

WILLIAM KIMONTH COOPER, OF LAKEWOOD, NEW JERSEY.

VINE-CUTTER.

No. 865,361.        Specification of Letters Patent.        Patented Sept. 10, 1907.

Application filed December 31, 1906. Serial No. 350,168.

*To all whom it may concern:*

Be it known that I, WILLIAM KIMONTH COOPER, a citizen of the United States, residing at Lakewood, in the county of Ocean and State of New Jersey, have invented certain new and useful Improvements in Vine-Cutters; and I do declare the following to be a full, clear, and exact description of the invention, such as will enable others skilled in the art to which it appertains to make and use the same.

This invention relates to an improved rake and vine cutter.

The object of the invention is to provide a vine cutting machine, which may be operated by hand or by horse or steam power, and which rakes up the vines and cuts them in short pieces, leaving nothing to be gathered up.

Another object is to provide a machine of this character, which may be adjusted to suit the person or horse operating it, and the depth of the vines to be cut.

In the accompanying drawings,—Figure 1 represents a front elevation of this improved machine; Fig. 2 represents a rear elevation thereof; Fig. 3 represents a perspective view of the frame with the wheels detached; Fig. 4 represents a front elevation of the inner face of one of the master wheels; and Fig. 5 represents an enlarged detail of the rake-bar support and adjusting means. Fig. 6 represents a detail perspective view of one of the shoes on the rake head. Fig. 7 represents a perspective view of one of the tines detached.

In the embodiment illustrated, the cutter frame 1 is rotatably supported on an axle 2, having wheels 3 and 4 at its opposite ends. For a hand-operated machine, these wheels are preferably made of solid metal to give the proper weight. As both wheels are similarly constructed, one only will be described. The wheel 4 has a hub 5 projecting on its inner face and having short strengthening ribs, as 6, radiating therefrom, and with its outer face also preferably provided with radial spoke-like rods, as 7, which extend through the rim 8 and form sharp teeth 9, which serve as anti-slipping devices for preventing the wheel from slipping and causing it to revolve. Other projections 10 are also preferably arranged in said wheel rim in staggered relation to the projections 9. This wheel has an annular internal gear or toothed rack 11, arranged on its inner face between the hub and the rim thereof. The wheels 3 and 4 are preferably held on the axle by means of hollow caps, as 12, which fit over the ends of the hub and are secured by split keys, as 13.

The cutter frame 1 consists of two arc-shaped plates 15 and 16, journaled on the axle 2, adjacent the inner faces of the wheels 3 and 4. A brace rod 17 rigidly connects these plates intermediately of their ends. Handle-supporting irons 18 and 19 are secured to one end of the plates 15 and 16, preferably by bolts, as 20, and the other ends of these plates have arms 21 and 22, preferably made integral therewith and extended at right angles thereto. These arms have longitudinal slots 23 and are provided with transverse ribs or teeth, as 24, on their front faces on opposite sides of the slots and at the edges of said front with laterally-extending flanges, as 25. Adjustably mounted in said slotted arms is a rake-head 30, preferably composed of two bars or plates 31 and 32, bolted together, and having oppositely-disposed registering recesses, as 33, for receiving the rake teeth or tines, as 34. The opposite ends of this rake-head have secured thereto, preferably by bolts, as 35, shoes 36 and 37, adapted to slide between the flanges of said slotted arms and have their outer faces provided with transverse ribs or teeth, as 38, to engage the teeth, as 24, of the arms. The screw-threaded ends of the bolts 35 extend through the slots 23 and are provided with clamping nuts, as 39. To adjust the rake head in said slotted arms, the nuts 39 are loosened and the shoes 36 and 37 disengaged from the ribs or teeth of the arms and are moved into the desired position, when the nuts are again tightened and the head clamped thereon. The rake teeth or tines 34 taper gradually from their upper to their lower end, and are preferably provided with shoulders at their upper or blunt ends to hold them against upward movement between the bars 31 and 32. These tines are made flat on one side with their other sides beveled at their fronts to form cutting edges. Mounted loosely in said plates 15 and 16 at the front of the axle 2 is a cutter shaft 40, having its ends projecting on the outer sides of said plates and having fixed thereto pinions 41 and 42, which mesh with the annular gears on the wheels 3 and 4. These pinions have annular flanges 43 and 44 projecting beyond their cogs to engage the outer ends of the annular gears to hold the pinions in place.

Spaced cutters, as 45, are fixed to the shaft 40 and are preferably made with four tangentially-disposed blades having flat faces arranged adjacent to the flat faces of the rake teeth and with their other faces beveled to form cutting edges which coöperate with the cutting edges of the rake teeth.

I claim as my invention,—

1. In a vine-cutting machine, the combination of an axle having wheels, a cutter frame comprising two arc-shaped plates journaled on said axle, said plates having arms at one end extended at right angles thereto, a rake head adjustably mounted in said arms and provided with tines having cutting edges, a cutter shaft loosely mounted in said plate means for rotating said shaft independently of said frame and spaced cutters secured to said shaft in position to cut with the edges of said tines.

2. In a vine cutting machine, a cutter frame having cutters and provided with slotted arms, said slotted arms having teeth on their front faces and a rake head having tines for coöperation with said cutters and provided with shoes having teeth for engaging the teeth of the arms to provide for the adjustment of said head in said frame.

3. In a vine cutting machine, a cutter frame having cutters and provided with slotted arms, and a rake head having tines for coöperation with said cutters and provided with shoes having bolts engaging said slotted arms to provide for the adjustment of said head in said frame.

In testimony whereof I have hereunto set my hand in presence of two subscribing witnesses.

WILLIAM KIMONTH COOPER.

Witnesses:
 CHAS. A. HALL,
 H. E. JOHNSON.